(12) United States Patent
Ko

(10) Patent No.: US 7,654,675 B2
(45) Date of Patent: Feb. 2, 2010

(54) LIGHT ASSEMBLY FOR AN IMAGE PROJECTOR

(75) Inventor: Shin-Bin Ko, Taipei (TW)

(73) Assignee: Compal Communications, Inc., Taipei (TW)

( * ) Notice: Subject to any disclaimer, the term of this patent is extended or adjusted under 35 U.S.C. 154(b) by 721 days.

(21) Appl. No.: 11/370,871

(22) Filed: Mar. 9, 2006

(65) Prior Publication Data

US 2007/0211219 A1    Sep. 13, 2007

(51) Int. Cl.
*G03B 21/16* (2006.01)
*G03B 21/28* (2006.01)
*F28F 7/00* (2006.01)
*F28F 1/30* (2006.01)
*H01L 23/34* (2006.01)

(52) U.S. Cl. .............................. 353/52; 353/61; 353/98; 165/80.3; 165/182; 257/722

(58) Field of Classification Search .................... 353/52, 353/56–57, 60–61, 98, 122; 362/612; 165/80.3, 165/182; 257/722
See application file for complete search history.

(56) References Cited

U.S. PATENT DOCUMENTS

| | | | |
|---|---|---|---|
| 4,739,152 A * | 4/1988 | Downs | 392/421 |
| 4,985,815 A * | 1/1991 | Endo | 362/294 |
| 6,181,053 B1 * | 1/2001 | Roberts | 313/46 |
| 7,357,537 B2 * | 4/2008 | Masuoka et al. | 362/346 |
| 2005/0201098 A1 * | 9/2005 | DiPenti et al. | 362/294 |

* cited by examiner

*Primary Examiner*—Georgia Y Epps
*Assistant Examiner*—Magda Cruz
(74) *Attorney, Agent, or Firm*—Winston Hsu

(57) ABSTRACT

A light assembly includes a heat-dissipating device, a light-emitting device, and a reflector. The heat-dissipating device defines an accommodating space. The light-emitting device is disposed in the accommodating space. The reflector serves to reflect light emitted by the light-emitting device, extends into the accommodating space, and surrounds the light-emitting device.

7 Claims, 3 Drawing Sheets ning in a
larger size for the conventional image projector.

LIGHT ASSEMBLY FOR AN IMAGE PROJECTOR

BACKGROUND OF THE INVENTION

1. Field of the Invention

The invention relates to a light assembly, more particularly to a light assembly for an image projector.

2. Description of the Related Art

A conventional image projector includes a bulb, and a plurality of fans for dissipating heat generated by the bulb.

The aforementioned conventional image projector is disadvantageous in that the fans occupy a relatively large space in the conventional image projector, thereby resulting in a larger size for the conventional image projector.

SUMMARY OF THE INVENTION

Therefore, the object of the present invention is to provide a light assembly fro an image projector that can overcome the aforesaid drawback associated with the prior art.

According to the present invention, a light assembly for an image projector comprises a heat-dissipating device, a light-emitting device, and a reflector. The heat-dissipating device includes a thermally conductive base, a thermally conductive peripheral wall, and a plurality of thermally conductive fins. The thermally conductive peripheral wall extends from the thermally conductive base, and cooperates with the thermally conductive base to define an accommodating space. The thermally conductive fins are disposed externally of the accommodating space, and are formed on the thermally conductive peripheral wall. The light-emitting device is disposed in the accommodating space. The reflector serves to reflect light emitted by the light-emitting device, extends into the accommodating space, and surrounds the light-emitting device.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
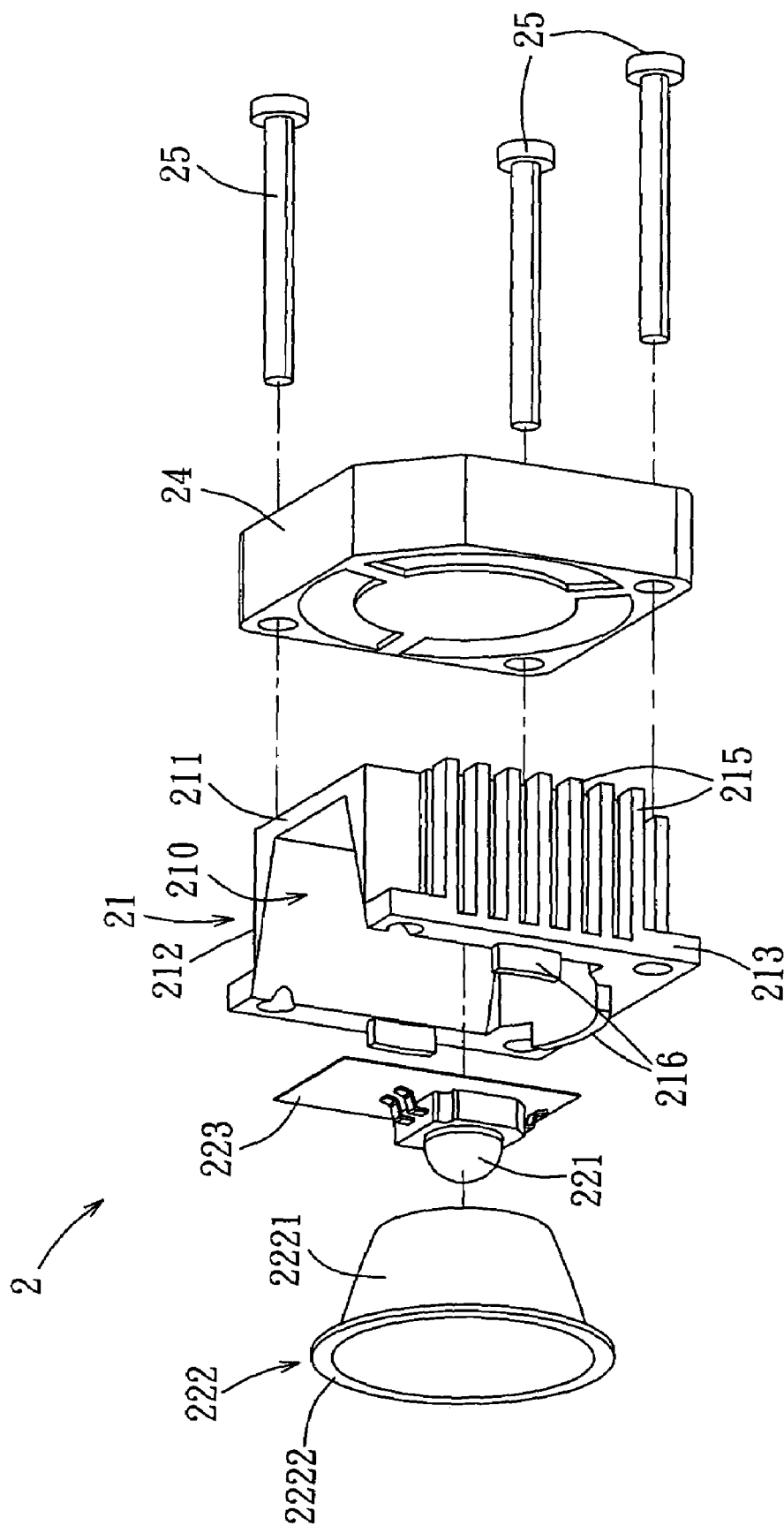
FIG. 1 is an exploded perspective view of the preferred embodiment of a light assembly for an image projector according to the present invention.
Figure 2:
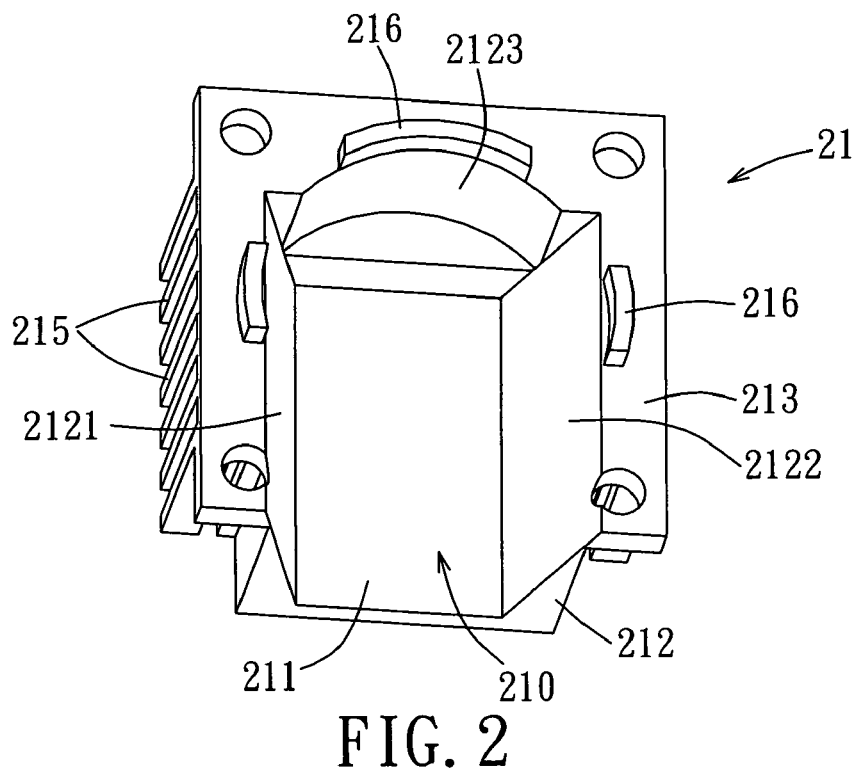
FIG. 2 is a perspective view to illustrate a heat-dissipating device of the preferred embodiment.

Referring to FIGS. 1 and 2, the preferred embodiment of a light assembly 2 according to this invention is shown to include a heat-dissipating device 21, a light-emitting device 221, and a reflector 222.

The heat-dissipating device 21 includes a thermally conductive base 211, a thermally conductive peripheral wall 212, and a plurality of thermally conductive fins 215.

The thermally conductive base 211 of the heat-dissipating device 21 is generally rectangular in shape, and has opposite first and second sides and opposite third and fourth sides.

The thermally conductive peripheral wall 212 of the heat-dissipating device 21 cooperates with the thermally conductive base 211 of the heat-dissipating device 21 to define an accommodating space 210. In this embodiment, the thermally conductive peripheral wall 212 of the heat-dissipating device 21 includes first, second, and third wall parts 2121, 2122, 2123 that extend respectively from the first, second, and third sides of the thermally conductive base 211 of the heat-dissipating device 21. Each of the first, second, and third wall parts 2121, 2122, 2123 of the thermally conductive peripheral wall 212 of the heat-dissipating device 21 has an inner surface. It is noted that the inner surface of the first wall part 2121 and the inner surface of the second wall part 2122 of the thermally conductive peripheral wall 212 of the heat-dissipating device 21 confine two opposite sides of the accommodating space 210 and diverge from the thermally conductive base 211.

Figure 3:
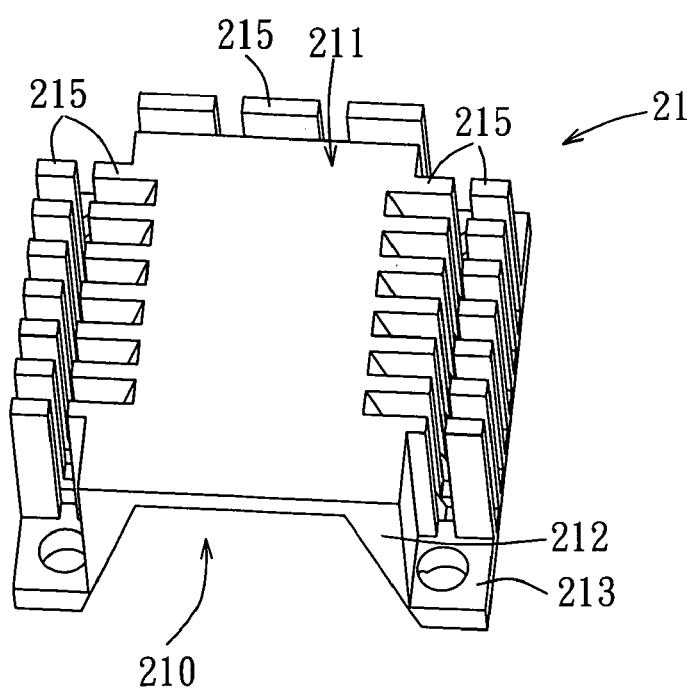
FIG. 3 is a perspective view to illustrate fins of the heat-dissipating device of the preferred embodiment.

With further reference to FIG. 3, the thermally conductive fins 215 of the heat-dissipating device 21 are disposed externally of the accommodating space 210 and are formed on the first, second, and third wall parts 2121, 2122, 2123 of the thermally conductive peripheral wall 212 of the heat-dissipating device 21.

The heat-dissipating device 21 further includes a flange 213 that extends laterally and outwardly from the first, second, third wall parts 2121, 2122, 2123 of the thermally conductive peripheral wall 212 of the heat-dissipating device 21, and three angularly displaced arcuate ribs 216 that are provided on the flange 213.

Figure 4:
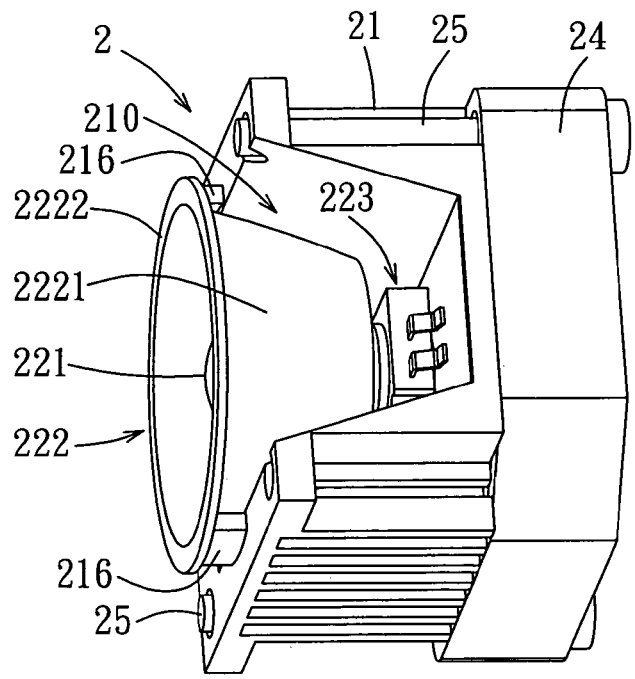
FIG. 4 is a perspective view to illustrate an assembled state of the preferred embodiment.

Referring to FIG. 4, the light assembly 2 further includes a fan unit 24 that is disposed externally of the accommodating space 210 and that is mounted on the thermally conductive base 211 of the heat-dissipating device 21.

The light assembly 2 further includes a circuit board 223 that is disposed in the accommodating space 210 and that is mounted on the thermally conductive base 211 of the heat-dissipating device 21.

The light-emitting device 221 is disposed in the accommodating space 210 and is mounted on the circuit board 223. In this embodiment, the light-emitting device 221 includes a light-emitting diode lamp.

The reflector 222 serves to reflect light emitted by the light-emitting device 221. In this embodiment, the reflector 222 includes a funnel-shaped body 2221 that extends into the accommodating space 210 and that surrounds the light-emitting device 221, and a rim 2222 that extends radially and outwardly from the funnel-shaped body 2221 and that is seated securely on the ribs 216 of the heat-dissipating device 21.

Figure 5:
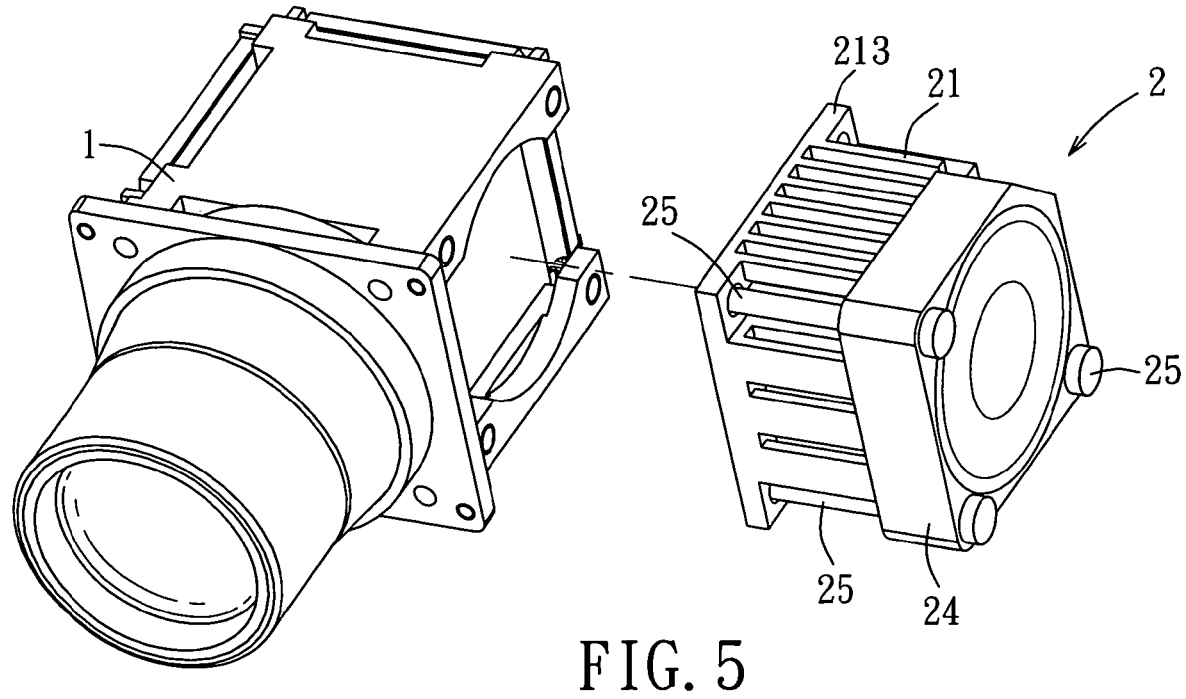
FIG. 5 is a schematic view to illustrate assembling of the preferred embodiment to an image projector.

Referring to FIG. 5, the light assembly 2 of this invention is mounted on an optical engine 1, which processes light emitted by the light-emitting device 221, and reflected by the reflector 222, of an image projector with the use of screw fasteners 25 that extend through the fan unit 24 and the flange 213 of the heat-dissipating device 21, and that threadedly engage the optical engine 1.

It has thus been shown that the light assembly 2 of this invention includes a heat-dissipating device 21, a light-emitting device 221, and a reflector 222. The heat-dissipating device 21 includes a thermally conductive base 211, a thermally conductive peripheral wall 212 that extends from the thermally conductive base 211 and that cooperates with the thermally conductive base 211 to define an accommodating space 210, and a plurality of thermally conductive fins 215 that are disposed externally of the accommodating space 210 and that are formed on the thermally conductive peripheral wall 212. The light-emitting device 221 is disposed in the accommodating space 210. The reflector 222 extends into the accommodating space 210 and surrounds the light-emitting device 221. The construction as such permits efficient dissipation of heat generated by the light-emitting device 221 by the heat-dissipating device 21, and minimizing of space occupied by the light-emitting device 221 and the reflector 222.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A light assembly for an image projector, said light assembly comprising:
    a heat-dissipating device including
        a thermally conductive base,
        a thermally conductive peripheral wall that extends from said thermally conductive base, and that cooperates with said thermally conductive base to define an accommodating space,
        a plurality of thermally conductive fins disposed externally of said accommodating space and formed on said thermally conductive peripheral wall,
        a flange that extends laterally and outwardly of said thermally conductive peripheral wall, and
        angularly displaced ribs that protrude from said flange;
    a light-emitting device disposed in said accommodating space; and
    a reflector for reflecting light emitted by said light-emitting device, said reflector including a funnel-shaped body that extends into said accommodating space and that surrounds said light-emitting device, and a rim that extends radially and outwardly from said funnel-shaped body and that is seated securely on said ribs.

2. The light assembly as claimed in claim 1, wherein said thermally conductive base of said heat-dissipating device is generally rectangular in shape, and has opposite first and second sides, and a third side, said thermally conductive peripheral wall of said heat-dissipating device including first, second, and third wall parts that extend respectively from said first, second, and third sides of said thermally conductive base of said heat-dissipating device.

3. The light assembly as claimed in claim 1, further comprising a fan unit that is disposed externally of said accommodating space and that is mounted on said thermally conductive base.

4. The light assembly as claimed in claim 1, further comprising a circuit board disposed in said accommodating space and mounted on said thermally conductive base, wherein said light-emitting device includes a light-emitting diode lamp and is mounted on said circuit board.

5. An image projector, comprising:
    a heat-dissipating device including
        a thermally conductive base,
        a thermally conductive peripheral wall that extends from said thermally conductive base, and that cooperates with said thermally conductive base to define an accommodating space,
        a plurality of thermally conductive fins disposed externally of said accommodating space and formed on said thermally conductive peripheral wall,
        a flange that extends laterally and outwardly of said thermally conductive peripheral wall, and
        angularly displaced ribs that protrude from said flange;
    a light-emitting device disposed in said accommodating space;
    a reflector for reflecting light emitted by said light-emitting device, said reflector including a funnel-shaped body that extends into said accommodating space and that surrounds said light-emitting device, and a rim that extends radially and outwardly from said funnel-shaped body and that is seated securely on said ribs; and
    an optical engine for processing light emitted by said light-emitting device and reflected by said reflector.

6. The image projector as claimed in claim 5, wherein said thermally conductive base of said heat-dissipating device is generally rectangular in shape, and has opposite first and second sides, and a third side, said thermally conductive peripheral wall of said heat-dissipating device including first, second, and third wall parts that extend respectively from said first, second, and third sides of said thermally conductive base of said heat-dissipating device.

7. The image projector as claimed in claim 5, further comprising a fan unit that is disposed externally of said accommodating space and that is mounted on said thermally conductive base.

* * * * *